United States Patent
Lu et al.

(10) Patent No.: US 8,406,579 B2
(45) Date of Patent: Mar. 26, 2013

(54) WAVELENGTH DIVISION MULTIPLEXING AND OPTICAL MODULATION APPARATUS

(75) Inventors: Hung-Chih Lu, Taoyuan County (TW); Jen-Inn Chyi, Taoyuan County (TW)

(73) Assignee: National Central University, Jhongli (TW)

( * ) Notice: Subject to any disclaimer, the term of this patent is extended or adjusted under 35 U.S.C. 154(b) by 228 days.

(21) Appl. No.: 13/038,553

(22) Filed: Mar. 2, 2011

(65) Prior Publication Data

US 2012/0189240 A1     Jul. 26, 2012

(30) Foreign Application Priority Data

Jan. 20, 2011   (TW) .............................. 100102085 A (51) Int. Cl.
  *G02F 1/295* (2006.01)
  *G02B 6/34* (2006.01)
(52) U.S. Cl. .......................................... 385/10; 385/37

(58) Field of Classification Search .................. None
See application file for complete search history.

(56) References Cited

U.S. PATENT DOCUMENTS

2007/0196047 A9 *   8/2007   Levner et al. .................. 385/37

* cited by examiner

*Primary Examiner* — Jerry Rahll
(74) *Attorney, Agent, or Firm* — Jackson IPG PLLC (57) ABSTRACT

A wavelength division multiplexing and optical modulation apparatus includes at least two modulation region-added grating-assisted cross-state directional coupler units and a modulation region-added cross-state directional coupler. The modulation region-added grating-assisted cross-state directional coupler units and the modulation region-added cross-state directional coupler unit are connected to one another in serial. Each of the modulation region-added grating-assisted cross-state directional coupler units each includes a modulation region-added cross-state directional coupler, a grating and a modulation region. The modulation region-added cross-state directional coupler unit includes an output waveguide, an input waveguide and a modulation region.

4 Claims, 12 Drawing Sheets

WAVELENGTH DIVISION MULTIPLEXING AND OPTICAL MODULATION APPARATUS

TECHNICAL FIELD OF THE DISCLOSURE

The present invention relates to a single apparatus for wavelength division multiplexing and optical modulation and, more particularly, to a wavelength division multiplexing and optical modulation apparatus including a modulation region-added cross-state directional coupler and at least two modulation region-added grating-assisted cross-state directional coupler units that can be connected to one another in serial to increase the number of channels.

DESCRIPTION OF THE RELATED ARTS

An IC-to-IC optical interconnector is made from a silicon-on-insulator wafer. The core of the IC-to-IC optical interconnector is an optical transceiver consisting of an optical transmitter and an optical receiver.

The optical transmitter consists of an optical modulator and a wavelength division multiplexer. No matter what the wavelength division multiplexer and the optical modulator are made of, the wavelength division multiplexer and optical modulator are always made separately. There has not been any single device for synchronously executing wavelength division multiplexing and optical modulation. Moreover, no matter what structures the wavelength division multiplexer and the optical modulator are made of, they are too big to be made in an system on a chip ("SOC"). Hence, how to make the wavelength division multiplexer and the optical modulator small is a key to the development of the optical transmitter.

For example, wavelength division multiplexers are made of three structures: an arrayed waveguide grating, a Mach-Zehnder interferometer and a ring resonator.

The arrayed waveguide grating is too big for use in an IC-to-IC optical interconnector. Because the IC-to-IC optical interconnector must include multiplexing and de-multiplexing, it cannot be used in an SOC if an arrayed waveguide grating is used. Hence, a typical IC-to-IC interconnector in which an arrayed waveguide grating is used cannot be used as an optical transceiver of an SOC in which the optical transmitter and the optical receiver are made two separate chips.

The Mach-Zehnder interferometer is high-cost, and the yield of the production of the Mach-Zehnder interferometer is low. The size of the Mach-Zehnder interferometer is smaller than that of the arrayed waveguide grating when the number of channels is low. When the wavelength difference is small, i.e., the total size is in the order of centimeters. Although, the Mach-Zehnder interferometer can be used in an IC-to-IC optical interconnector, its fabrication is difficult. If the number of channels is high, connection in serial is necessary, and the size is inevitably huge and becomes a heavy burden for a lithography process in a silicon-on-insulator wafer process. Hence, the Mach-Zehnder interferometer must be used in a very precise lithography process, and the cost is high while the yield is low.

The ring resonator can only be used in a sub-micrometer waveguide, with huge coupling loss and at a high cost. Because the 3 dB bandwidth of the ring resonator is small, i.e., in the order of 0.1 Å, its requirement for the precision of the wavelengths of light is high. Moreover, the waveguide must be bent for a large angle, and can only be used in a sub-micrometer waveguide smaller than 0.55 µm. Such a small waveguide however entails large coupling loss between an optical fiber and a chip. Moreover, a laser source that is operated at high power and wavelength precision must be used, and this increases the cost.

Other wavelength division multiplexers for optical communication include wavelength division multiplexing directional couplers. The wavelength division multiplexing directional couplers share a band such as 1550 nm. In an IC-to-IC optical interconnector, the operation wavelength of light is 1550 nm. Because of the light operate in the same band, the coupling periods must be close to one another. If light of two wavelengths in a band is to be transmitted from two output terminals, a least common multiple of the coupling periods must be used, and this is often tens or hundreds of times as long as the coupling periods. Hence, wavelength division multiplexing directional couplers are only suitable for optical communication, not for IC-to-IC optical interconnection.

Optical modulators are classified to two structures: a Mach-Zehnder interferometer and a ring resonator. The features of and problems with the use of the Mach-Zehnder interferometer and the ring resonator have been described above.

So far, in practice, there are only two structures that can complete an SOC optical transmitter. At first, a Mach-Zehnder interferometer optical modulator is used together with a Mach-Zehnder interferometer wavelength division multiplexer. Secondly, a Mach-Zehnder interferometer optical modulator is used together with a ring resonator wavelength division multiplexer. These optical transmitters are however huge for using Mach-Zehnder interferometers.

Hence, the prior arts do not fulfill all users' requests on actual use.

SUMMARY OF THE DISCLOSURE

The main purpose of the present disclosure is to provide a single and small apparatus for wavelength division multiplexing and optical modulation so that it can be used in an optical transmitter that is the core of an IC-to-IC optical interconnector.

The second purpose of the present disclosure is to provide a single and complete optical transmitter for synchronous multi-channel wavelength division multiplexing and multi-signal optical modulation.

The third purpose of the present disclosure is to provide a modulation region-added grating-assisted cross-state directional coupler unit that can be connected to other modulation region-added grating-assisted cross-state directional coupler units to increase the number of channels, thus executing wavelength division multiplexing on one hand and executing optical modulation on the other hand.

To achieve the above purposes, the present disclosure is a wavelength division multiplexing and optical modulation apparatus, which includes at least two modulation region-added grating-assisted cross-state directional coupler units and a modulation region-added cross-state directional coupler. Each of the modulation region-added grating-assisted cross-state directional coupler units each includes a modulation region-added cross-state directional coupler, a grating and a modulation region. The modulation region-added cross-state directional coupler includes an input waveguide and an output waveguide. The modulation region-added cross-state directional coupler is a region in which an end of the output waveguide extends parallel to an end of the output waveguide of the other modulation region-added grating-assisted cross-state directional coupler. The length of the region in which the output waveguides extend parallel to each other is same or larger than the length of the grating. The input waveguide is connected to the output waveguide of the other modulation region-added grating-assisted cross-state directional coupler. The grating is located in a portion of the modulation region-added cross-state directional coupler in which the output waveguides and extend parallel to each other. In the modulation region, the output waveguide extends parallel to the output waveguide of the other modulation region-added grating-assisted cross-state directional coupler unit. The modulation region-added cross-state directional coupler is connected to the modulation region-added grating-assisted cross-state directional coupler unit. The modulation region-added cross-state directional coupler includes an output waveguide, an input waveguide and a modulation region. The output waveguide is connected to the input waveguide of the last one of the modulation region-added grating-assisted cross-state directional coupler units. The input waveguide includes an end extending parallel to an opposite end of the output waveguide of the modulation region-added cross-state directional coupler. In the modulation region, the output waveguide of the modulation region-added cross-state directional coupler and the input waveguide thereof extend parallel to each other.

Regarding the optical modulation, taking digital signals for example, when light of a certain wavelength is transmitted from the first input waveguide to a coupling region and the electric signal is taken as the logic "0", the grating is not modulated, and the spectrum of the grating is not biased, and the light is reflected to the first output waveguide. Hence, the light of this wavelength is in the first output waveguide, and this is taken as the logic "1." When the electric signal is the logic "1", the grating is modulated, the spectrum of the grating is biased so that the light cannot be reflected by the grating of which the spectrum is biased. Hence, the light is coupled to a place where the first output waveguide is interrupted and leaky its power from the cut-off of the waveguide. Now, there is no light of this wavelength in the first output waveguide, and this is taken as the logic "0", and the signal is modulated.

Regarding the wavelength division multiplexing, when light of different wavelengths is transmitted from the first output waveguide to the coupling region, all of the light is coupled to another output terminal because the coupling length is half a coupling period. However, when a grating of a certain wavelength is made after the coupling region, the light of one of the wavelengths is reflected to another input terminal that is taken as an additional output terminal for wavelength division multiplexing light of a different wavelength.

Accordingly, a novel wavelength division multiplexing and optical modulation apparatus is obtained.

BRIEF DESCRIPTIONS OF THE DRAWINGS

The present disclosure will be better understood from the following detailed descriptions of the preferred embodiments according to the present disclosure, taken in conjunction with the accompanying drawings, in which.

DESCRIPTION OF THE PREFERRED EMBODIMENTS

The following descriptions of the preferred embodiments are provided to understand the features and the structures of the present disclosure.

Figure 1:
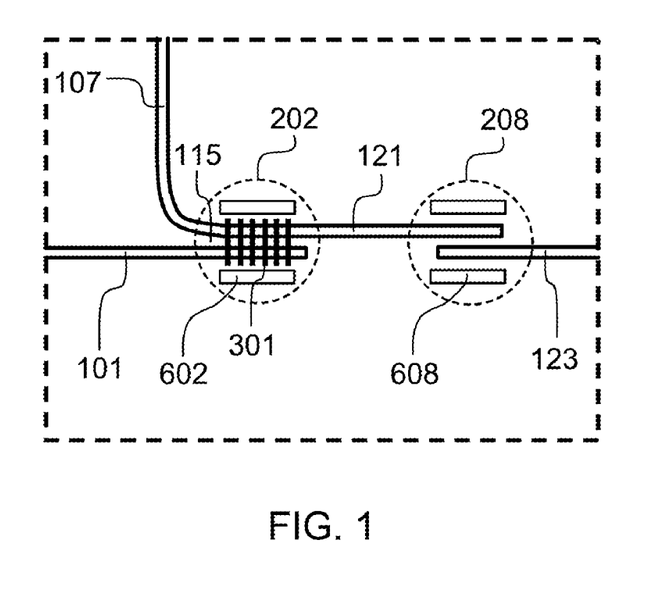
FIG. 1 is a block diagram of a wavelength division multiplexing and optical modulation apparatus according to the first embodiment of the present invention.

Referring to FIG. 1, there is shown a wavelength division multiplexing and optical modulation apparatus according to a first embodiment of the present invention. The wavelength division multiplexing and optical modulation apparatus includes a modulation region-added grating-assisted cross-state directional coupler unit 202 and a modulation region-added cross-state directional coupler unit 208.

The modulation region-added grating-assisted cross-state directional coupler unit 202 includes a modulation region-added cross-state directional coupler 115, a grating 301 and a modulation region 602. The modulation region-added cross-state directional coupler 115 includes an input waveguide 107 and an output waveguide 101. The modulation region-added cross-state directional coupler 115 is a region in which an end of the output waveguide 101 extends parallel to an end of an output waveguide 121 of the modulation region-added cross-state directional coupler unit 208. The length of this region in which the output waveguide 101 extends parallel to the output waveguide 121 is same or larger than the length of the grating 301. The input waveguide 107 is connected to the end of the output waveguide 121. The grating 301 is located in a portion of the modulation region-added cross-state directional coupler 115 in which the ends of the output waveguides 101 and 121 extend parallel to each other. The ends of the output waveguides 101 and 121 that extend parallel to each other are located in the modulation region 602.

The modulation region-added cross-state directional coupler unit 208 is connected to the modulation region-added grating-assisted cross-state directional coupler unit 202. The modulation region-added cross-state directional coupler unit 208 includes the output waveguide 121, an input waveguide 123 and a modulation region 608. An end of the input waveguide 123 extends parallel to an opposite end of the output waveguide 121. The ends of the output waveguide 121 and the input waveguide 123 that extend parallel to each other is located in the modulation region 608.

Figure 2:
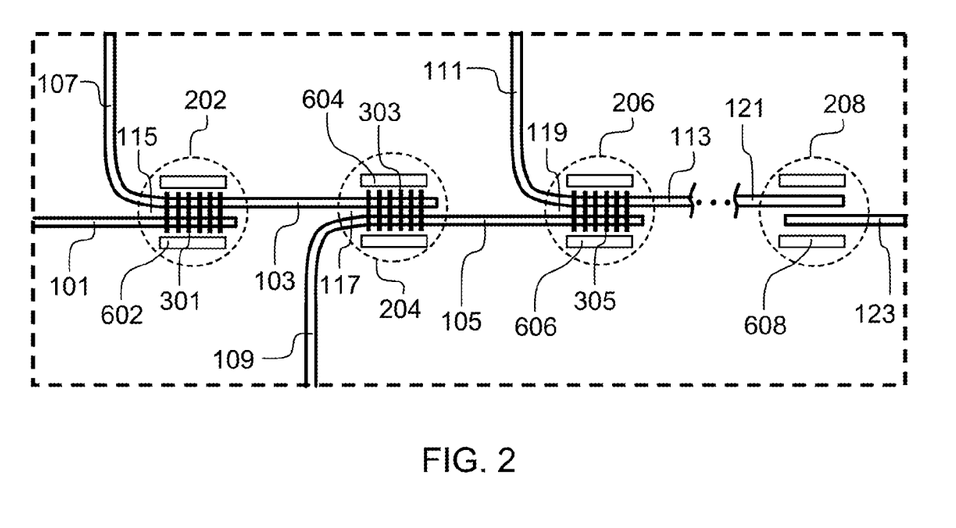
FIG. 2 is a block diagram of a wavelength division multiplexing and optical modulation apparatus according to the second embodiment of the present invention.

Referring to FIG. 2, there is shown a wavelength division multiplexing and optical modulation apparatus according to a second embodiment of the present invention. The second embodiment is like the first embodiment except including at least three modulation region-added grating-assisted cross-state directional coupler units 202, 204 and 206. The modulation region-added grating-assisted cross-state directional coupler units are connected to one another in serial. The first modulation region-added grating-assisted cross-state directional coupler unit 202 is connected to the second modulation region-added grating-assisted cross-state directional coupler unit 204. The second modulation region-added grating-assisted cross-state directional coupler unit 204 is connected to the third modulation region-added grating-assisted cross-state directional coupler unit 206. The third modulation region-added grating-assisted cross-state directional coupler unit 204 is connected to a next modulation region-added grating-assisted cross-state directional coupler unit if any. The number of the modulation region-added grating-assisted cross-state directional coupler units is a designer's choice. Anyway, the last modulation region-added grating-assisted cross-state directional coupler unit is connected to the modulation region-added cross-state directional coupler unit 208.

The first modulation region-added grating-assisted cross-state directional coupler unit 202 includes the modulation region-added cross-state directional coupler 115, the grating 301 and the modulation region 602.

The first modulation region-added grating-assisted cross-state directional coupler unit 202 includes a first modulation region-added cross-state directional coupler 115, a first grating 301 and a first modulation region 602. The first modulation region-added cross-state directional coupler 115 includes a first input waveguide 107 and a first output waveguide 101.

Similarly, the second modulation region-added grating-assisted cross-state directional coupler unit 204 includes a second modulation region-added cross-state directional coupler 117, a second grating 303 and a second modulation region 604. The second modulation region-added cross-state directional coupler 117 includes a second input waveguide 109 and a second output waveguide 103.

Similarly, the third modulation region-added grating-assisted cross-state directional coupler unit 206 includes a third modulation region-added cross-state directional coupler 119, a third grating 305 and a third modulation region 606. The third modulation region-added cross-state directional coupler 119 includes a third input waveguide 111 and a third output waveguide 105.

Similarly, the last modulation region-added grating-assisted cross-state directional coupler unit includes a last modulation region-added cross-state directional coupler, a last grating and a last modulation region. The last modulation region-added cross-state directional coupler includes a last input waveguide and a last output waveguide.

The first modulation region-added cross-state directional coupler 115 is a region in which an end of the first output waveguide 101 extends parallel to an end of the output waveguide 103 of the second modulation region-added grating-assisted cross-state directional coupler unit 204. The length of this region in which the first output waveguide 101 extends parallel to the second output waveguide 103 of the second modulation region-added grating-assisted cross-state directional coupler unit 204 is same or larger than the length of the grating 301. The first input waveguide 107 is connected to the end of the second output waveguide 103 of the second modulation region-added grating-assisted cross-state directional coupler unit 204. The grating 301 is located in a portion of the modulation region-added cross-state directional coupler 115 in which the ends of the output waveguides 101 and 103 extend parallel to each other. The ends of the output waveguides 101 and 103 that extend parallel to each other are located in the modulation region 602.

The second modulation region-added cross-state directional coupler 117 is a region in which an end of the second output waveguide 103 extends parallel to an end of the third output waveguide 105 of the third modulation region-added grating-assisted cross-state directional coupler unit 206. The length of this region in which the second output waveguide 103 of the second modulation region-added grating-assisted cross-state directional coupler unit 204 extends parallel to the third output waveguide 105 of the third modulation region-added grating-assisted cross-state directional coupler unit 206 is same or larger than the length of the second grating 303. The second input waveguide 109 of the second modulation region-added grating-assisted cross-state directional coupler unit 204 is connected to the end of the third output waveguide 105 of the third modulation region-added grating-assisted cross-state directional coupler unit 206. The second grating 303 is located in a portion of the second modulation region-added cross-state directional coupler 117 in which the ends of the output waveguides 103 and 105 extend parallel to each other. The ends of the output waveguides 103 and 105 that extend parallel to each other are located in the second modulation region 604.

The third modulation region-added grating-assisted cross-state directional coupler unit 206 is connected to the next modulation region-added grating-assisted cross-state directional coupler unit (not shown) as the second modulation region-added grating-assisted cross-state directional coupler unit 204 is connected to the third modulation region-added grating-assisted cross-state directional coupler unit 206.

The last modulation region-added cross-state directional coupler is a region in which an end of the last output waveguide extends parallel to an end of the output waveguide 121 of the modulation region-added cross-state directional coupler unit 208. The length of this region in which the last output waveguide extends parallel to the output waveguide 121 is same or larger than the length of the last grating. The last input waveguide is connected to the end of the output waveguide 121. The last grating is located in a portion of the last modulation region-added cross-state directional coupler in which the end of the last output waveguide extends parallel to the end of the output waveguide 121 extend parallel to each other. The end of the last output waveguide and the end of the output waveguide 121 that extends parallel to each other are located in the last modulation region.

The modulation region-added cross-state directional coupler unit 208 is connected to the last modulation region-added grating-assisted cross-state directional coupler unit. The modulation region-added cross-state directional coupler unit 208 includes the output waveguide 121, the input waveguide 123 and the modulation region 608. An end of the input waveguide 123 extends parallel to an opposite end of the last output waveguide. The end of the last output waveguide and the end of the input waveguide 123 that extend parallel to each other is located in the modulation region 608.

Figure 3:
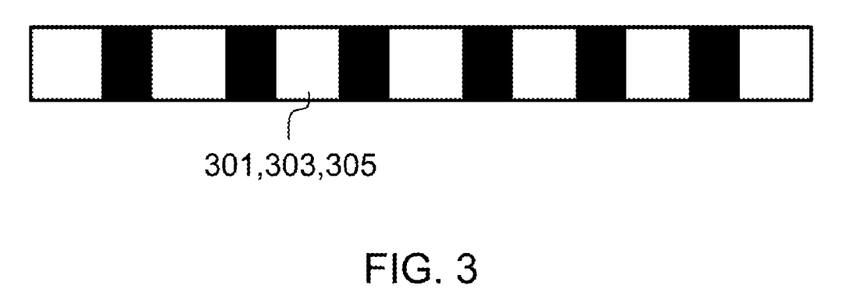
FIG. 3 shows a grating of the wavelength division multiplexing and optical modulation apparatus shown in FIG. 1.
Figure 4:
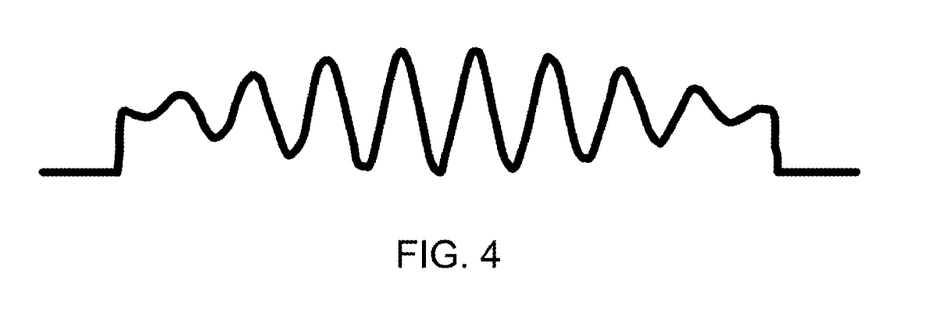
FIG. 4 shows a curve of the grating of the wavelength division multiplexing and optical modulation apparatus.

Referring to FIGS. 3 and 4, there is a grating used in the wavelength division multiplexing and optical modulation apparatus described referring to FIG. 2. The gratings 301, 303 and 305 are preferably Bragg gratings. Bragg gratings are not like regular gratings. A regular grating is even while a Bragg grating is uneven as shown in FIG. 4. It varies most radically in the middle. The variation gets smaller toward the ends, and there is almost no variation at the ends. A Bragg grating includes an almost ideal rectangular filtering spectrum. Therefore, Bragg gratings are used in the modulation region-added cross-state directional coupler 115, 117 and 119.

Figure 5:
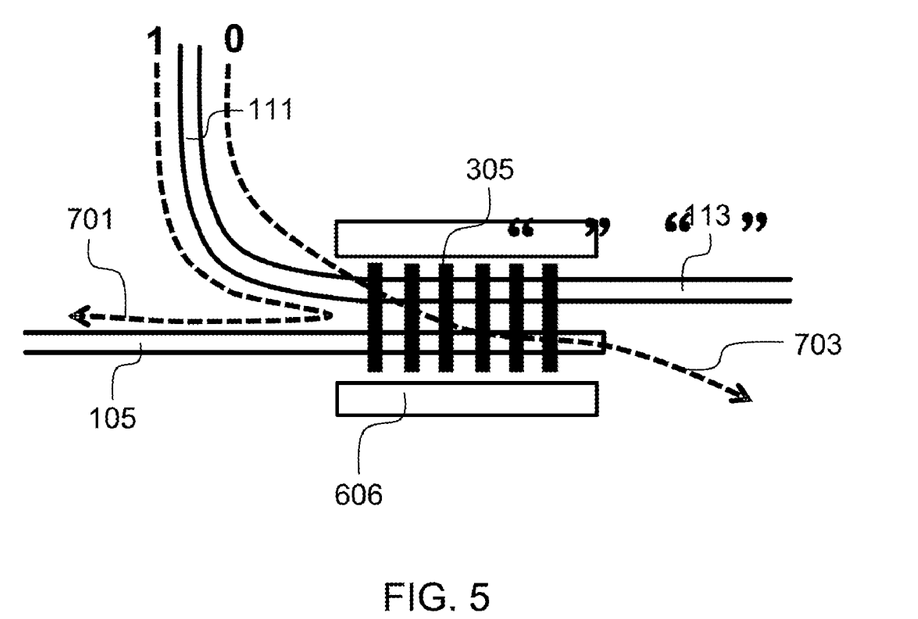
FIG. 5 shows a modulation region-added grating-assisted cross-state directional coupler unit.

Referring to FIG. 5, the third modulation region-added grating-assisted cross-state directional coupler unit 206 is shown for example. Light of a certain wavelength is fed to the third input waveguide 111. Before the third modulation region 606 is modulated, the light of the certain wavelength is reflected by the third grating 305 and coupled to the third output waveguide 105 and finally transmitted from third output waveguide 105. Now, the light is logic "1" as indicated by an optical transmission path 701. When the third modulation region 606 is modulated, the light will not be reflected because the spectrum of the third grating 305 is changed. Thus, the light is simply coupled to the cut-off of third output waveguide 105 and finally leaky its power from the cut-off of third output waveguide 105. Now, the light is the logic "0" as indicated by another optical transmission path 703.

Figure 6:
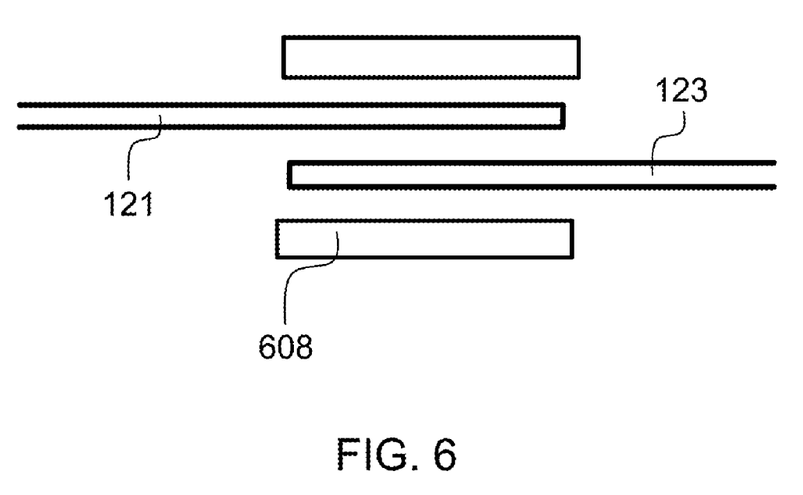
FIG. 6 shows a modulation region-added cross-state directional coupler.

Referring to FIG. 6, shown is the modulation region-added cross-state directional coupler unit 208. There is no need for any grating because one last wavelength is processed in the modulation region-added cross-state directional coupler unit 208. Before the modulation region 608, which does not include any grating, is modulated, the light is coupled to the put waveguide 121 and taken as the logic "1." When the modulation region 608 is modulated, the light is leaky its power from the cut-off of input waveguide 123. Now, the output waveguide 121 does not provide any optical power, and the light is modulated to be the logic "0."

Figure 7:
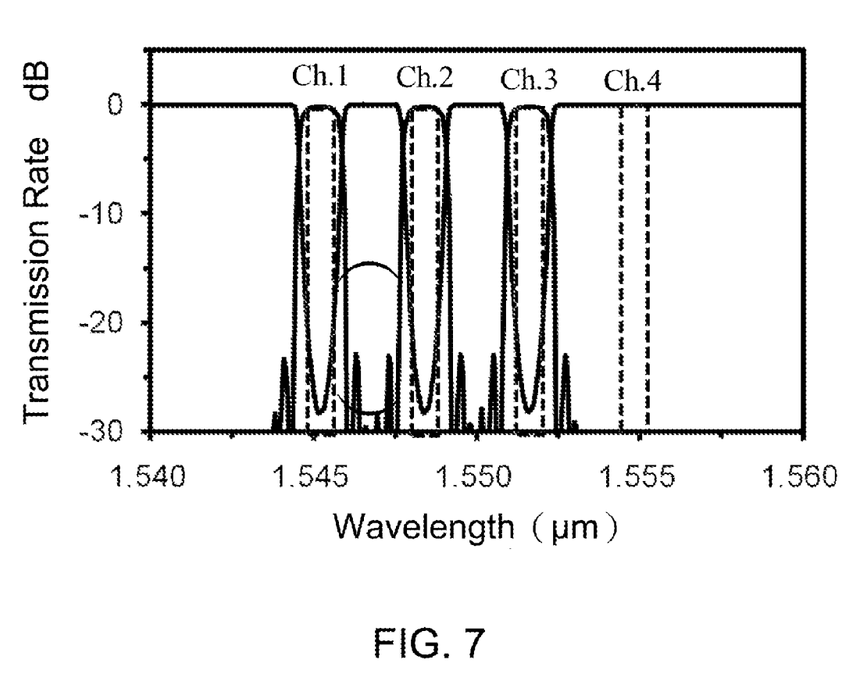
FIG. 7 shows a spectrum of a four-channel wavelength division multiplexing and optical modulation apparatus according to the present invention.

Referring to FIG. 7, shown is a spectrum of a four-channel wavelength division multiplexing and optical modulation apparatus described referring to FIG. 2. There are four output spectrums that include almost ideal rectangular filtered waves.

Figure 8:
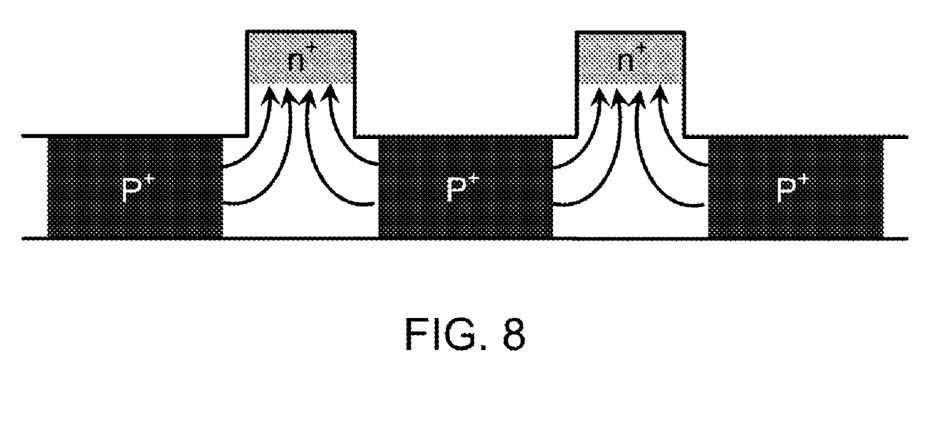
FIG. 8 shows a first p-i-n and waveguide unit of a modulation region.
Figure 9:
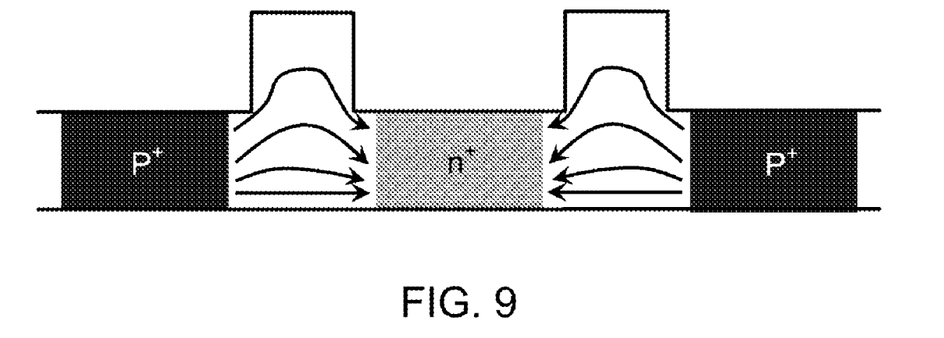
FIG. 9 shows a second p-i-n and waveguide unit of the modulation region.

Referring to FIG. 8, there is shown a first p-i-n and a waveguide of the modulation region. Referring to FIG. 9, there is shown a second p-i-n and a waveguide of the modulation region. These elements are conventional CMOS structures. The modulation region of the present invention can be any conventional CMOS structure, and is highly compatible with circuits.

Referring to FIG. 2, the modulation region-added grating-assisted cross-state directional coupler unit 202 modifies a conventional grating-assisted directional coupler by the use of the modulation region 602 for grating and waveguide modulation. Many channels are formed by connection in serial. Thus, there is provided wavelength division multiplexing and synchronous multi-signal optical modulation in an SOC that includes multiple channels.

The present invention is based on the principle that a grating reflects light of a certain wavelength. The first grating 301 is made in the first modulation region-added cross-state directional coupler 115, and the first modulation region 602 is made in the first waveguide. The first grating 301 is modulated to provide the first modulation region-added grating-assisted cross-state directional coupler unit 202.

In operation, light of a certain wavelength such as λ1 is fed to the first input waveguide 107. Before the grating is modulated, the light of the wavelength λ1 is reflected by the first grating 301 and transmitted from the first output waveguide 101. The light is wavelength division multiplexed to the first output waveguide 101, and the light is modulated to be the logic "1."

When the first grating 301 is modulated, the spectrum of the first grating 301 is biased, the light of the wavelength λ1 is not reflected by the first grating 301, and is not wavelength division multiplexed to the first output waveguide 101. The light is coupled to a place where the waveguide of the first output waveguide 101 is interrupted and leaky its power from the cut-off of the waveguide. Now, the first output waveguide 101 does not provide any λ1 optical power, and the light is modulated to be the logic "0." Therefore, the light of the wavelength λ1 is wavelength division multiplexed on one hand and optically modulated on the other hand.

Figure 10:
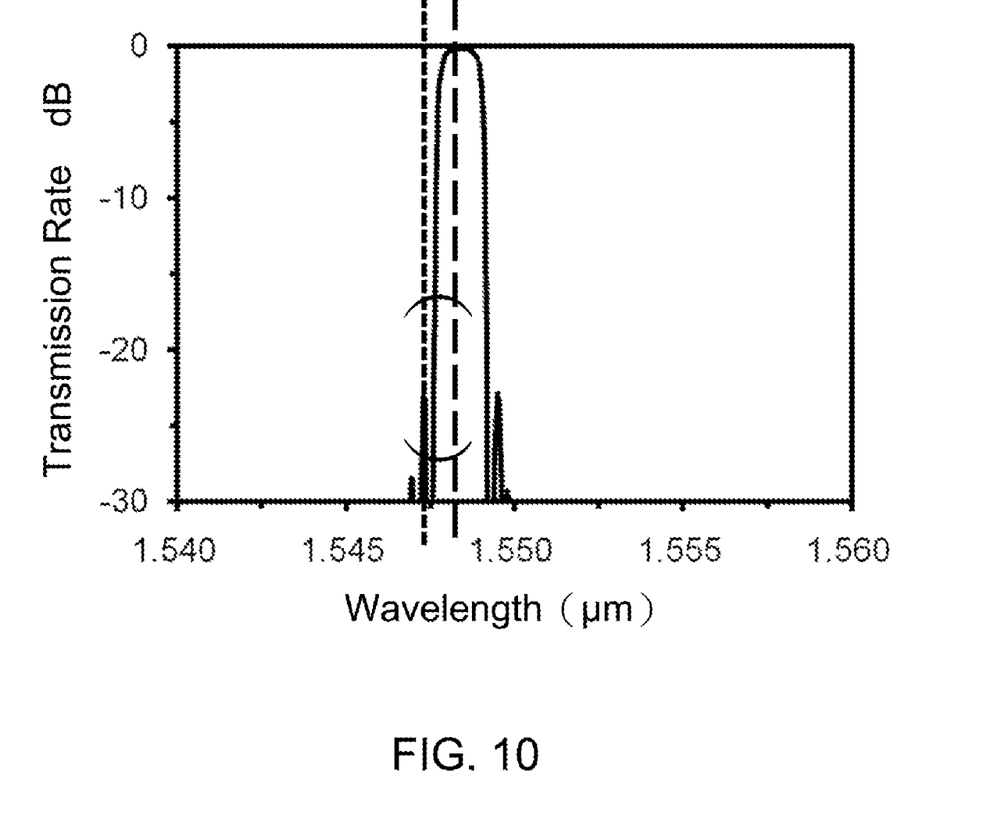
FIG. 10 shows a spectrum modulation of the wavelength division multiplexing and optical modulation apparatus.
Figure 11:
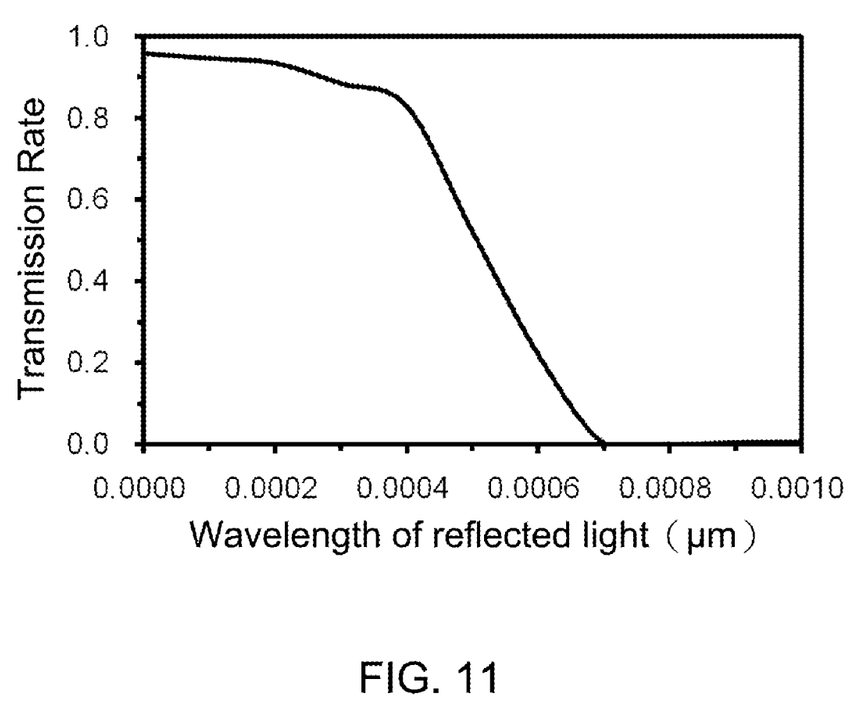
FIG. 11 shows an electro-optic conversion of the wavelength division multiplexing and optical modulation apparatus.
Figure 12:
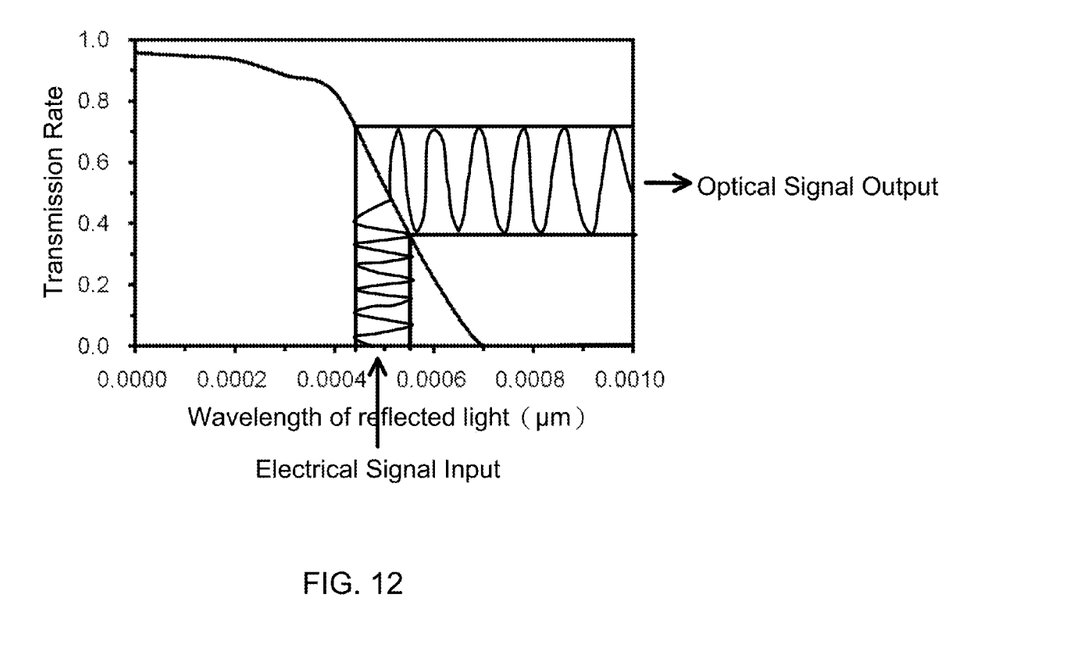
FIG. 12 shows the electro-optic conversion and modulation of the wavelength division multiplexing and optical modulation apparatus.

Referring to FIG. 10, the center of a spectrum is biased in a range defined between two dash lines when a grating is modulated. The range defined between the dash lines is the operation range. Referring to FIG. 11, a rectilinear section of the curve between "1" and "0" is the electro-optical conversion region. Referring to FIG. 12, an electrical signal is converted to an optical signal in the rectilinear section. In consideration of the ability to resist noises, its signal-noise ratio must be high. Hence, the rectilinear section of the curve must be adequately linearity. The rectilinear section of the curve of the wavelength division multiplexing and optical modulation apparatus of the present invention is perfectly linearity.

To execute multiple operations, multiple modulation region-added grating-assisted cross-state directional coupler units are connected to one another in serial as shown in FIG. 2.

Light of another certain wavelength λ2 is fed to the second input waveguide 109. The light of the wavelength λ2 is transmitted through the second modulation region-added grating-assisted cross-state directional coupler 204. Before the second modulation region 604 is modulated, the light of the wavelength λ2 is transmitted to the second grating 303 and reflected to second output waveguide 103. Finally, the light of the wavelength λ2 is transmitted to the first modulation region-added grating-assisted cross-state directional coupler unit 202. Not like the light of the wavelength λ1, the light of the wavelength λ2 is not processed by the first grating 301. Hence, the light of the wavelength λ2 is directly coupled to the first output waveguide 101 and taken as the logic "1."

When the second modulation region 604 is modulated, the spectrum of the second grating 303 is biased, and the second grating 303 does not execute any task on the light of the wavelength λ2. Therefore, the light of the wavelength λ2 is coupled to the place where the waveguide of the second output waveguide 103 is interrupted and finally leaky its power from the cut-off of second waveguide 103. Now, the second output waveguide 103 does not provide any power regarding the light of the wavelength λ2, and the light of the wavelength λ2 is taken as the logic "0." Hence, the light of the wavelength λ2 is wavelength division multiplexed on one hand and optically modulated on the other hand.

Similarly, light of another wavelength λ3 is fed to the third input waveguide 111. The light of the wavelength λ3 is transmitted to the third modulation region-added grating-assisted cross-state directional coupler 206. Before the third modulation region 606 is modulated, the light of the wavelength λ3 is transmitted to the third grating 305 and reflected to the third output waveguide 105. Finally, the light of the wavelength λ3 is transmitted to the second modulation region-added grating-assisted cross-state directional coupler unit 204. Not like the light of the wavelength λ1 and the light of the wavelength λ2, the light of the wavelength λ3 is not processed by the first grating 301 or the second grating 303. The light of the wavelength λ3 is directly coupled to the first output waveguide 101 and taken as the logic "1."

When the third modulation region 606 is modulated, the spectrum of the third grating 305 is biased. The light of the wavelength λ3 is transmitted to the third grating 305 and then coupled to the place where the waveguide of the third output waveguide 105 is interrupted and finally leaky its power from the cut-off of the third output waveguide 105. Now, the third output waveguide 105 does not provide any power regarding the light of the wavelength λ3, and the light of the wavelength λ3 is taken as the logic "0." Hence, the light of the wavelength λ3 is wavelength division multiplexed on one hand and optically modulated on the other hand.

Taking four channels for example, light of the wavelength λ4 does not have to be processed in any grating. The light of the wavelength λ4 is coupled to the modulation region-added cross-state directional coupler unit 208. Before the modulation region 608 is modulated, the light of the wavelength λ4 is coupled to the output waveguide 121 and transmitted through the first modulation region-added grating-assisted cross-state directional coupler unit 202, the second modulation region-added grating-assisted cross-state directional coupler unit 204 and the third modulation region-added grating-assisted cross-state directional coupler unit 206. Not like the light of the wavelength λ1, the light of the wavelength λ2 and the light of the wavelength λ3, the light of the wavelength λ4 is not processed by the first grating 301, the second grating 303 or the third grating 305. The light of the wavelength λ4 is directly coupled to the first output waveguide 101 and taken as the logic "1."

When the modulation region 608 is modulated, the light of the wavelength λ4 is coupled to and finally leaky its power from a place where another input waveguide 123 is interrupted. Now, the output waveguide 121 does not provide any power regarding the light of the wavelength λ4, and the light of the wavelength λ4 is modulated to the logic "0." Hence, the light of the wavelength λ4 is wavelength division multiplexed on one hand and optically modulated on the other hand.

Furthermore, the wavelength division multiplexing and optical modulation apparatus can be used as a wavelength division multiplexer if the modulation regions are not used.

Taking the 1×4 wavelength division multiplexer shown in FIG. 2 for example, the first grating 301 is used to reflect the light of the wavelength λ1 and separate the light of the wavelength λ1 and transmit the light of the wavelength λ1 from the first input waveguide 107.

The light of the wavelengths λ2, λ3 and λ4 is transmitted from the second output waveguide 103 to a next stage. When the light of the wavelengths λ2, λ3 and λ4 is transmitted from the second output waveguide 103 to the second modulation region-added cross-state directional coupler 117, the second grating 303 is used to reflect the light of the wavelength λ2, separate the light of the wavelength λ2, and transmit the light of the wavelength λ2 from the second input waveguide 109.

The light of the wavelengths λ3 and λ4 is transmitted from the third output waveguide 105 to a next stage. When the light of the wavelengths λ3 and λ4 is transmitted from the third output waveguide 105 to the third modulation region-added cross-state directional coupler 119, the third grating 305 is used to reflect the light of the wavelength λ3, separate the light of the wavelength λ3, and transmit the light of the wavelength λ3 from the third input waveguide 111.

The light of the wavelength λ4 is transmitted from the fourth input waveguide 113. Hence, there is formed a 1×4 wavelength division multiplexer for transmitting the light of the wavelength λ1, the light of the wavelength λ2, the light of the wavelength λ3, the light of the wavelength λ4 from the first input waveguide 107, the second input waveguide 109, the third input waveguide 111 and the fourth input waveguide 113, respectively.

As discussed above, the present invention is based on conventional grating-assisted directional couplers. According to the present invention, cross-state is used to make the coupling length to be half a coupling period, thus achieving a small size. Inventively, the modulation regions are added to the grating-assisted directional coupler to modulate the gratings. Hence, the modulation region-added grating-assisted cross-state directional couplers wavelength division multiplex on one hand and optically modulate on the other hand. That is, the present invention provides a complete optical transmitter which alone executes wavelength division multiplexing and multi-signal optical modulation, is small. More modulation region-added grating-assisted cross-state directional couplers are connected to one another to increase the number of channels. Moreover, the present invention provides a wavelength division multiplexer when the optical modulation regions are not used. Hence, the length of the present invention is smaller than that of the prior art by about an order. The present invention can synchronously execute the above-mentioned two functions and is small and is more suitable for use in an IC-to-IC optical interconnector than the prior art is. The present invention considerably reduces the size of the optical transmitter that is the core of the IC-to-IC optical interconnector, and break through the bottleneck in the size in the integrated optics. Hence, the present invention can be used in an SOC optical transceiver that is the core of the IC-to-IC optical interconnector.

The preferred embodiments herein disclosed are not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A wavelength division multiplexing and optical modulation apparatus including:

at least two modulation region-added grating-assisted cross-state directional coupler units each including:

a modulation region-added cross-state directional coupler including an input waveguide and an output waveguide, wherein the modulation region-added cross-state directional coupler is a region in which an end of the output waveguide extends parallel to an end of the output waveguide of the other modulation region-added grating-assisted cross-state directional coupler, wherein the length of the region in which the output waveguides extend parallel to each other is same or larger than the length of the grating, wherein the input waveguide is connected to the output waveguide of the other modulation region-added grating-assisted cross-state directional coupler;

a grating located in a portion of the modulation region-added cross-state directional coupler in which the output waveguides and extend parallel to each other; and a modulation region in which the output waveguide extends parallel to the output waveguide of the other modulation region-added grating-assisted cross-state directional coupler unit; and a modulation region-added cross-state directional coupler unit connected to the modulation region-added grating-assisted cross-state directional coupler unit, wherein the modulation region-added cross-state directional coupler unit includes:

an output waveguide connected to the input waveguide of the last one of the modulation region-added grating-assisted cross-state directional coupler units;

an input waveguide including an end extending parallel to an opposite end of the output waveguide thereof; and a modulation region in which the output waveguide thereof and the input waveguide thereof extend parallel to each other.

2. The wavelength division multiplexing and optical modulation apparatus according to claim 1, wherein the modulation region-added grating-assisted cross-state directional coupler units are connected to each other in serial, an end of one of the modulation region-added grating-assisted cross-state directional coupler units is connected to an end of the other modulation region-added grating-assisted cross-state directional coupler unit that includes an opposite end connected to an end of the modulation region-added cross-state directional coupler.

3. The wavelength division multiplexing and optical modulation apparatus according to claim 1, wherein the gratings are Bragg gratings.

4. The wavelength division multiplexing and optical modulation apparatus according to claim 1, wherein the modulation regions are CMOS structures.

* * * * *